(12) United States Patent
Ota et al.

(10) Patent No.: US 6,510,699 B2
(45) Date of Patent: Jan. 28, 2003

(54) DISPLACEMENT CONTROL APPARATUS FOR VARIABLE DISPLACEMENT COMPRESSOR

(75) Inventors: Masaki Ota, Kariya (JP); Masahiro Kawaguchi, Kariya (JP); Tomoji Tarutani, Kariya (JP); Yasunori Ueda, Kariya (JP); Yoshinori Inoue, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/047,479

(22) Filed: Oct. 23, 2001

(65) Prior Publication Data

US 2002/0073722 A1 Jun. 20, 2002

(30) Foreign Application Priority Data

Oct. 24, 2000 (JP) ........................................ 2000-324389

(51) Int. Cl.[7] ............................. F25B 1/00; F25B 49/00
(52) U.S. Cl. ........................ 62/133; 417/222.2; 236/79
(58) Field of Search ............................ 62/228.3, 228.5, 62/133; 417/222.2; 60/547.1; 236/79, 87

(56) References Cited

U.S. PATENT DOCUMENTS 4,057,301 A * 11/1977 Foster .................... 60/547.1 X
4,245,780 A * 1/1981 Franz ...................... 236/87 X
6,146,107 A * 11/2000 Kawaguchi et al. ...... 417/222.2

FOREIGN PATENT DOCUMENTS

| JP | 5-231311 | 9/1993 | ........... F04B/27/08 |
| JP | 6-147112 | 5/1994 | ........... F04B/27/08 |
| JP | 8-21358 | 1/1996 | ........... F04B/27/08 |
| JP | 8-109879 | 4/1996 | ........... F04B/27/14 |

* cited by examiner

Primary Examiner—William Wayner
(74) Attorney, Agent, or Firm—Morgan & Finnegan, LLP

(57) ABSTRACT

A displacement control apparatus is used for a variable displacement compressor. The compressor is driven by an internal combustion engine. The compressor has an inclining swash plate and a piston, which is reciprocated by the swash plate. The stroke of the piston is changed in accordance with the inclination angle of the swash plate. The displacement of the compressor is changed between a minimum displacement and a maximum displacement in accordance with the stroke of the piston. The apparatus includes an actuator coupled to the swash plate. The actuator is actuated by exhaust pressure or intake pressure from the engine. A controller changes the inclination angle of the swash plate by actuating the actuator.

12 Claims, 4 Drawing Sheets

DISPLACEMENT CONTROL APPARATUS FOR VARIABLE DISPLACEMENT COMPRESSOR

BACKGROUND OF THE INVENTION

The present invention relates to a displacement control apparatus for controlling the displacement of a variable displacement compressor.

A typical compressor used for a vehicle air-conditioning system is connected to an internal combustion engine of a vehicle, which is an external drive source, via a clutch mechanism such as an electromagnetic clutch. When refrigeration is not needed, the power transmission is stopped by disengaging the electromagnetic clutch. The compressor is stopped accordingly.

Engaging and disengaging the electromagnetic clutch causes shock. The shock lowers the driving performance of the vehicle. Therefore, a clutchless type compressor, which does not have a clutch, has been proposed. A variable displacement type compressor is used for the clutchless type compressor. When refrigeration is not needed, the variable displacement type compressor minimizes the displacement of the compressor, thereby stopping refrigeration.

Changing the pressure in a crank chamber, which accommodates a drive plate, changes the difference between the pressure in the crank chamber and the pressure in the cylinder bores. This changes the inclination angle of the drive plate. When the inclination angle of the drive plate is zero, pistons do not reciprocate. That is, refrigerant is not compressed. In this state, there is no difference between the pressure in the crank chamber and the pressure in the cylinder bores. Thus, the inclination angle of the drive plate cannot be increased. Therefore, the displacement of the variable displacement type compressor cannot be set to zero. As a result, unnecessary compression is performed and the fuel economy of the internal combustion engine deteriorates.

SUMMARY OF THE INVENTION

The objective of the present invention is to provide a displacement control apparatus that sets the minimum displacement of a variable displacement compressor to zero.

To attain the above object, the present invention provides a displacement control apparatus for a variable displacement compressor used in a refrigerant circuit of an air conditioner. The compressor is driven by an internal combustion engine. The compressor has an inclining drive plate and a piston, which is reciprocated by the drive plate. The stroke of the piston is changed in accordance with the inclination angle of the drive plate. The displacement of the compressor is changed between a minimum displacement and a maximum displacement in accordance with the stroke of the piston. The apparatus comprises an actuator connected to the drive plate. The actuator is actuated by the exhaust pressure or the intake pressure from the engine. A controller changes the inclination angle of the drive plate by actuating the actuator.

The present invention also provides a method for controlling a displacement control apparatus for a variable displacement compressor used in a refrigerant circuit of an air conditioner. The compressor is driven by an internal combustion engine. The compressor has an inclining drive plate and a piston, which is reciprocated by the drive plate. The stroke of the piston is changed in accordance with the inclination angle of the drive plate. The displacement of the compressor is changed between a minimum displacement and a maximum displacement in accordance with the stroke of the piston. The method includes changing the inclination angle of the drive plate by applying a force to the drive plate. The force is created by exhaust pressure or intake pressure from the engine.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A displacement control apparatus of a swash plate type variable displacement compressor for a vehicle air-conditioning system according to a first embodiment of the present invention will be described with reference to FIGS. 1 and 2.

Figure 1:
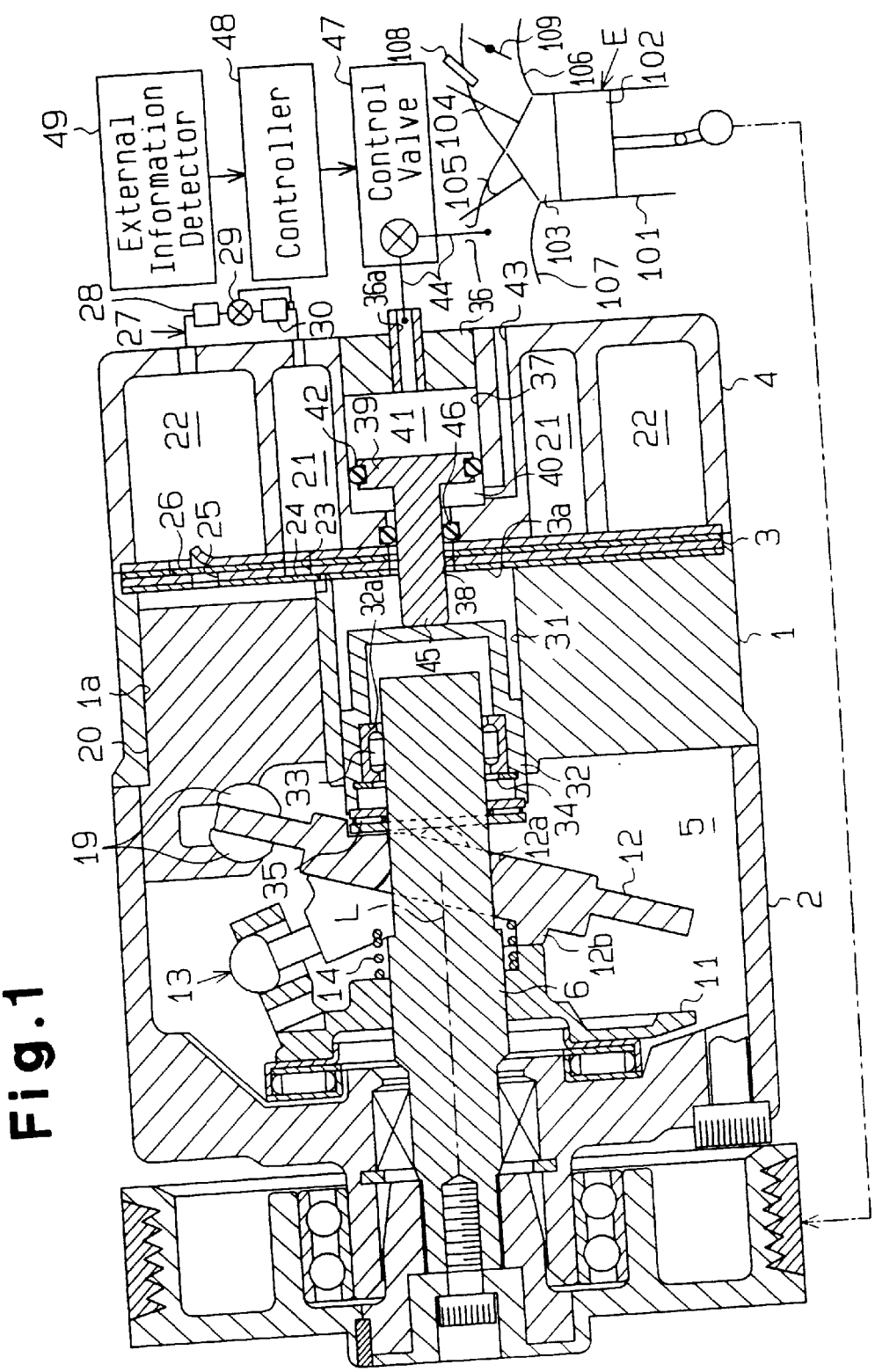
FIG. 1 is a cross sectional view illustrating a swash plate type variable displacement compressor, which has a displacement control apparatus according to a first embodiment of the present invention.

As shown in FIG. 1, the swash plate type variable displacement compressor has a cylinder block 1, a front housing 2, and a rear housing 4. The front housing 2 is fixed to the front end of the cylinder block 1. The rear housing 4 is fixed to the rear end of the cylinder block 1. A valve plate 3 is located between the cylinder block 1 and the rear housing 4. The left side of FIG. 1 is referred to as the front end of the compressor and the right side of FIG. 1 is referred to as the rear end of the compressor.

The cylinder block 1 and the front housing 2 define a crank chamber 5. A drive shaft 6 is rotatably supported in the crank chamber 5. The drive shaft 6 is connected to an internal combustion engine E, which is a drive source of a vehicle, to transmit power. The drive shaft 6 is connected to the internal combustion engine E without being connected to a clutch mechanism such as an electromagnetic clutch. As long as the internal combustion engine E runs, the drive shaft 6 is driven. The internal combustion engine E has a plurality of cylinders 101. A piston 102 is accommodated in each cylinder 101. Each piston defines a combustion chamber 103 in the corresponding cylinder 101. Each cylinder 101 has an intake valve 104 and a discharge valve 105. An intake pipe 106 and an exhaust pipe 107 are connected to the cylinders 101. Each cylinder has a fuel injector 108. A throttle valve 109 is provided in the intake pipe 106.

A lug plate 11 is fixed to the drive shaft 6 to integrally rotate with the drive shaft 6 in the crank chamber 5. A swash plate 12, which functions as a drive plate, is accommodated in the crank chamber 5. A shaft hole 12a is formed in the center of the swash plate 12. The drive shaft 6 extends through the hole 12a. The swash plate 12 is supported by the drive shaft 6 through the hole 12a. The swash plate 12 is movable along the surface of the drive shaft 6 and is pivotal about the drive shaft 6. A hinge mechanism 13 is located between the lug plate 11 and the swash plate 12. The swash plate 12 is operably connected to the lug plate 11 and the drive shaft 6 through the hinge mechanism 13. The swash plate 12 integrally rotates with the lug plate 11 and the drive shaft 6.

A coil spring 14 is provided between the lug plate 11 and the swash plate 12 on the drive shaft 6. The coil spring 14 urges the swash plate 12 in the direction in which the inclination angle of the swash plate 12 is decreased, that is, towards the valve plate 3. The inclination angle is determined by the inclination of the swash plate 12 with respect to a plane that is perpendicular to the axis L of the drive shaft 6.

Cylinder bores 1a (only one bore is shown in FIG. 1) are arranged in the cylinder block 1 at equal angular intervals about the axis L of the drive shaft 6. A single headed piston 20 is accommodated in each cylinder bore 1a. The opening of each cylinder bore 1a is closed with the valve plate 3. A compression chamber is defined in each cylinder bore 1a. The volume of each compression chamber changes according to the reciprocation of the corresponding piston 20. The end of each piston 20 is connected to the periphery of the swash plate 12 by a pair of shoes 19. Thus, the rotation of the swash plate 12 is converted into the reciprocation of the pistons 20 in accordance with the inclination angle of the swash plate 12.

The valve plate 3 and the rear housing 4 define a suction chamber 21 and a discharge chamber 22. The discharge chamber 22 surrounds the suction chamber 21. A suction port 23, a suction valve 24, a discharge port 25, and a discharge valve 26 are formed on the valve plate 3 for each cylinder bore 1a. Each suction valve 24 selectively opens and closes the corresponding suction port 23. Each discharge valve 26 selectively opens and closes the corresponding discharge port 25. The suction chamber 21 and each cylinder bore 1a are connected through the corresponding suction port 23. The discharge chamber 22 and each cylinder bore 1a are connected through the corresponding discharge port 25.

When each piston 20 moves from the top dead center to the bottom dead center, refrigerant in the suction chamber 21 flows into the corresponding cylinder bore 1a through the corresponding suction port 23 and the corresponding suction valve 24. When each piston 20 moves from the bottom dead center to the top dead center, refrigerant in the corresponding cylinder bore 1a is compressed to a predetermined pressure. Then, the compressed refrigerant is discharged to the discharge chamber 22 through the corresponding discharge port 25 while forcing the corresponding discharge valve 26 to open.

As shown in FIG. 1, a refrigerant circuit of a vehicle air-conditioning system is formed by the compressor and an external refrigerant circuit 27. The external refrigerant circuit 27 includes a condenser 28, an expansion valve 29, which functions as a decompression device, and an evaporator 30.

Figure 2:
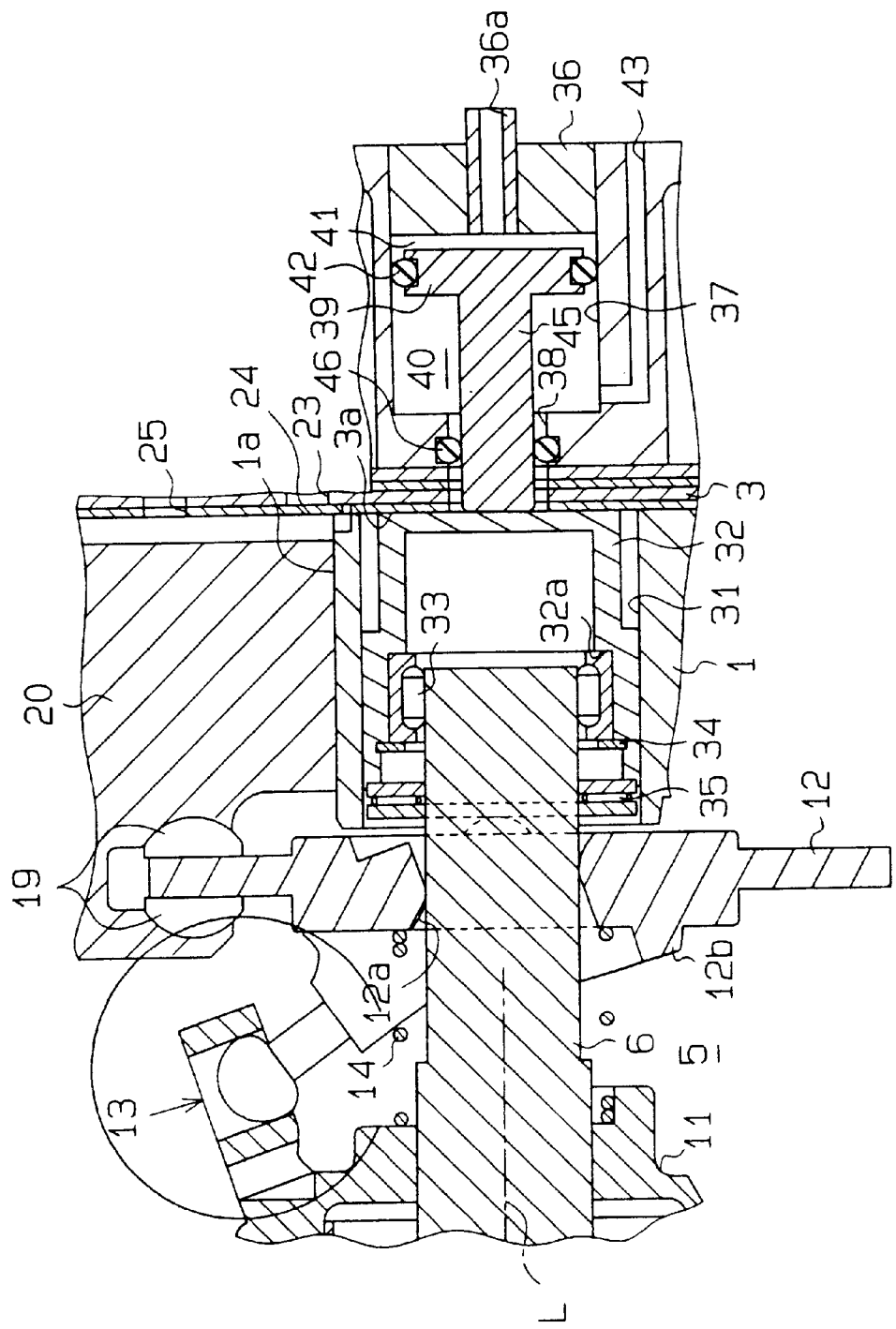
FIG. 2 is an enlarged partial cross-sectional view illustrating the compressor according to FIG. 1 when the displacement is minimum.

As shown in FIGS. 1 and 2, a coupler chamber 31 is defined at the center portion of the cylinder block 1. A cup-shaped coupler 32 is accommodated in the coupler chamber 31 to move in the direction of the axis L. The rear end of the drive shaft 6 is fitted in a cavity of the coupler 32.

A radial bearing 33 is located between the rear end of the drive shaft 6 and the inner surface of the coupler 32. The radial bearing 33 is held between a snap ring 34 and a step 32a of the coupler 32. This prevents the radial bearing 33 from escaping from the coupler 32. The radial bearing 33 and the coupler 32 move in the direction of the axis L of the drive shaft 6. The rear end of the drive shaft 6 is rotatably supported by the inner surface of the coupler chamber 31 through the radial bearing 33 and the coupler 32.

A thrust bearing 35 is located between the swash plate 12 and the coupler 32. The thrust bearing 35 is supported by and slides along the drive shaft 6. The thrust bearing 35 prevents the abutment of the swash plate 12 against the coupler 32.

When the swash plate 12 moves towards the coupler 32, the swash plate 12 presses the coupler 32 rearward through the thrust bearing 35. Therefore, the coupler 32 moves toward the valve plate 3 and abuts a positioning surface 3a of the valve plate 3. As shown in FIG. 2, the abutment of the coupler 32 against the positioning surface 3a prevents the swash plate 12 from moving further axially rearward. In this state, the inclination angle of the swash plate 12 is zero degrees, that is, the minimum.

When the coupler 32 moves towards the swash plate 12 from the position shown in FIG. 2, the coupler 32 presses the swash plate 12 forward through the thrust bearing 35. Therefore, the swash plate 12 moves toward the lug plate 11 and the inclination angle of the swash plate 12 increases. As shown in FIG. 1, the abutment of a first stopper 12b of the swash plate 12 against the lug plate 11 prevents the swash plate 12 and the coupler 32 from moving further axially forward. In this state, the inclination angle of the swash plate 12 is the maximum.

A spool chamber 37 is defined radially inward of the suction chamber 21 at the center of the rear housing 4. A plug 36 is press fitted in the spool chamber 37. The spool chamber 37 is connected to the coupler chamber 31 through a through hole 38 formed in the rear housing 4 and the valve plate 3.

A cylindrical spool 39 is accommodated in the spool chamber 37 and moves axially. A first pressure chamber 40 and a second pressure chamber 41 are defined by the spool 39 in the spool chamber 37. The first pressure chamber 40 and the second pressure chamber 41 are separated by a seal 42, which is fitted to the outer surface of the spool 39. The first pressure chamber 40 is exposed to the atmosphere through a passage 43, which is formed in the rear housing 4. The second pressure chamber 41 is connected to the exhaust pipe 107 of the internal combustion engine E through a port 36a, which is formed in the plug 36, and a pipe (pressure control passage) 44, which is connected to the port 36a.

A control rod 45 extends axially from the front surface of the spool 39. The distal end of the control rod 45 passes through the through hole 38 and projects into the coupler chamber 31. The coupler 32 is urged rearward by the coil spring 14 through the swash plate 12. Therefore, the control rod 45 abuts against the coupler 32. A seal 46 is fitted between the rear housing 4 and the control rod 45. The coupler chamber 31 and the first pressure chamber 40 are separated by the seal 46. In the first embodiment, the coil spring 14, the coupler 32, the spool chamber 37, the spool 39, and the control rod 45 form an actuator. The actuator is operably connected to the swash plate 12.

An actuator control valve 47, which is an electromagnetic valve, is provided in the pipe 44. The current supplied to the actuator control valve 47 is controlled by a controller 48 in accordance with external information from an external information detector 49. The external information includes whether the air-conditioning system is turned on or turned off, the room temperature of a vehicle and a target temperature. As a result, the opening degree of the pipe 44, or the exhaust pressure drawn into the second pressure chamber 41 from the internal combustion engine E, is adjusted. In the first embodiment, the pipe 44, the actuator control valve 47, the external information detector 49, and the controller 48 form a controller.

The force of the coil spring 14 acts on the swash plate 12 to decrease the inclination angle of the swash plate 12. A force based on the difference between the pressure in the first pressure chamber 40 (atmospheric pressure) and the pressure in the second pressure chamber 41 acts on the swash plate 12 to increase the inclination angle of the swash plate 12. The force is transmitted through the spool 39, the control rod 45, the coupler 32, and the thrust bearing 35. Thus, the swash plate 12 is moved until the forces acting on the swash plate are balanced. The inclination angle of the swash plate 12 is determined accordingly.

When the opening degree of the actuator control valve 47 increases, the pressure in the second pressure chamber 41 increases. The inclination angle of the swash plate 12 increases in accordance with the difference between the pressure in the first pressure chamber 40 and the pressure in the second pressure chamber 41. Therefore, the coil spring 14 is compressed and the swash plate 12 is moved until the increase of the force of the coil spring 14 offsets the increase of the force based on the difference between the pressure in the first pressure chamber 40 and the pressure in the second pressure chamber 41. As a result, the stroke of the pistons 20 increase, which increases the displacement of the compressor.

When the opening degree of the actuator control valve 47 decreases, the pressure in the second pressure chamber 41 decreases. This decreases the force that increases the inclination angle of the swash plate 12 based on the difference between the pressure in the first pressure chamber 40 and pressure in the second pressure chamber 41. Therefore, the inclination angle of the swash plate 12 decreases and the force of the coil spring 14 acting on the swash plate 12 decreases. The swash plate 12 is moved until the decrease of the force of the coil spring 14 is offset by the decrease of the force based on the difference between the pressure in the first pressure chamber 40 and the pressure in the second pressure chamber 41. As a result, the stroke of each piston 20 decreases, which decreases the displacement of the compressor.

When refrigeration is not needed, or when the switch of the air-conditioning system is off, the controller 48 fully closes the actuator control valve 47. When the actuator control valve 47 is fully closed, the difference between the pressure in the first pressure chamber 40 and the pressure in the second pressure chamber 41 is minimum. As a result, the force of the coil spring 14 moves the swash plate 12 to a position such that the coupler 32 abuts against the positioning surface 3a of the valve plate 3. In this state, the inclination angle of the swash plate 12 is zero. Thus, the pistons 20 do not reciprocate even when the swash plate 12 rotates. Therefore, the displacement of the compressor is zero. The inclination angle of the swash plate 12 increases when the opening degree of the actuator control valve 47 is increased, and then the pressure in the second pressure chamber 41 increases by the exhaust pressure from the internal combustion engine E.

The first embodiment provides the following advantages.

The actuator (14, 32, 37, 39, 45) adjusts the inclination angle of the swash plate 12 in accordance with the force based on the exhaust pressure (exhaust energy) of the internal combustion engine E and the force of the coil spring 14. Therefore, the inclination angle of the swash plate 12 can be increased from zero degrees. Thus, the minimum displacement of the compressor can be set to zero. When the compressor is set to the minimum displacement, the compressor does not compress refrigerant. This reduces the loss of energy of the internal combustion engine E and improves fuel economy.

The actuator (14, 32, 37, 39, 45) and the controller (44, 47, 49, 48) alter the displacement of the compressor within a variation range and determine the position of the swash plate 12. Therefore, a displacement control structure other than the actuator (14, 32, 37, 39, 45) and the controller (44, 47, 49, 48) is not required. This simplifies the structure of the air-conditioning system.

Figure 3:
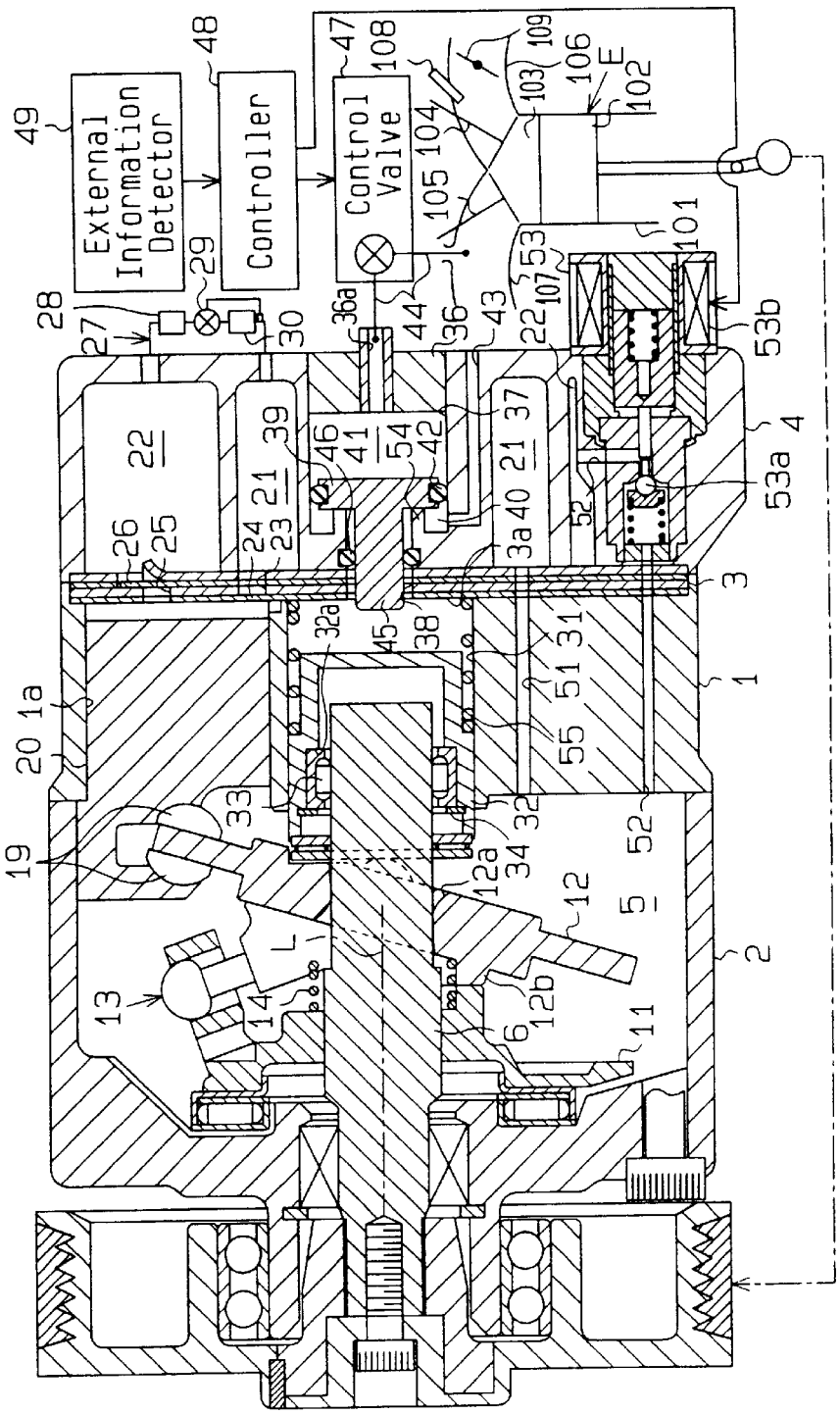
FIG. 3 is a cross-sectional view illustrating a swash plate type variable displacement compressor, which has a displacement control apparatus according to a second embodiment.

FIG. 3 illustrates a second embodiment of the present invention. The second embodiment differs from the first embodiment shown in FIGS. 1 and 2 in that the inclination angle of the swash plate 12 is altered by adjusting the pressure in the crank chamber 5. In the second embodiment, only parts that are different from those of the first embodiment shown in FIGS. 1 and 2 are explained. Like members are given like numbers and detailed explanations are omitted.

The controller 48, the external information detector 49, a bleed passage 51, a supply passage 52, and a displacement control valve 53 form a control mechanism for controlling the pressure in the crank chamber 5. The bleed passage 51 and the supply passage 52 are provided in the housing. The bleed passage 51 connects the crank chamber 5 with the suction chamber 21, which is part of a suction pressure zone. The suction pressure zone is exposed to the suction pressure (Ps). The supply passage 52 connects the crank chamber 5 with the discharge chamber 22, which is part of a discharge pressure zone. The discharge pressure zone is exposed to the discharge pressure (Pd). The displacement control valve 53, which is formed of an electromagnetic valve, is provided in the supply passage 52. The displacement control valve 53 includes a valve body 53a and a solenoid 53b. The valve body 53a adjusts the opening degree of the supply passage 52. The solenoid 53b determines the position of the valve body 53a in accordance with the current supplied from the controller 48. The displacement control valve 53 has substantially the same structure as the actuator control valve 47.

Adjusting the opening degree of the displacement control valve 53 controls the amount of gas supplied to the crank chamber 5 through the supply passage 52 and the amount of discharged gas from the crank chamber 5 through the bleed passage 51. This determines the pressure in the crank chamber 5. The difference between the pressure in the crank chamber 5 and the pressure in each cylinder bore 1a (compression chamber) is altered in accordance with the pressure in the crank chamber 5. Therefore, the inclination angle of the swash plate 12 is changed and the stroke of each piston 20, or the displacement, is adjusted.

When the opening degree of the displacement control valve 53 decreases, the pressure in the crank chamber 5 decreases. Thus, the difference between the pressure in the crank chamber 5 and the pressure in each cylinder bore 1a decreases. As a result, the swash plate 12 moves such that the inclination angle increases. Therefore, the displacement of the compressor increases. When the opening degree of the displacement control valve 53 increases, the pressure in the crank chamber 5 increases. Thus, the difference between the pressure in the crank chamber 5 and the pressure in each cylinder bore 1a increases. As a result, the inclination angle of the swash plate 12 decreases, which decreases the displacement of the compressor. When the displacement control valve 53 is fully open, the swash plate 12 moves such that the coupler 32 abuts against the positioning surface 3a of the valve plate 3. In this state, the displacement of the compressor is minimum and zero.

A spring 55 is provided between the coupler 32 and the valve plate 3 in the coupler chamber 31. The spring 55 urges the coupler 32 to increase the inclination angle of the swash plate 12. The spring 55 is weaker than the coil spring 14.

As mentioned in the description of the prior art, the control mechanism (48, 49, 51, 52, 53) alone cannot increase the displacement of the compressor from the minimum, which is zero. However, the controller 48 of the second embodiment opens the actuator control valve 47 to increase the displacement of the compressor. Then, the pressure in the second pressure chamber 41 increases and a force acts on the swash plate 12 to increase the inclination angle. Therefore, the inclination angle of the swash plate 12 increases from zero degrees. This increases the displacement of the compressor from zero.

The axial length of the control rod 45 according to the second embodiment is less than that of the control rod 45 of the first embodiment. A second stopper 54 projects from the surface that faces the front surface of the spool 39 in the first pressure chamber 40. Therefore, when the spool 39 moves such that the front surface of the spool 39 abuts against the second stopper 54, the distal end of the control rod 45 projects only slightly from the positioning surface 3a. The controller 48 opens the actuator control valve 47 only to increase the displacement of the compressor from the minimum. At other times, the actuator control valve 47 is closed.

The actuator (14, 32, 37, 39, 45) and the controller (44, 47, 49, 48) are used only for increasing the inclination angle of the swash plate 12 from the minimum. When the inclination angle of the swash plate 12 is not minimum, only the control mechanism (48, 49, 51, 52, 53) is used to change the displacement. The coil spring 14 is used for displacement control except when the inclination angle of the swash plate is being increased from the minimum.

The second embodiment provides the following advantages in addition to the advantages of the first embodiment shown in FIGS. 1 and 2.

The intermittent combustion of the internal combustion engine E generates a pulsation in the exhaust pressure of the internal combustion engine E. Thus, the pressure in the second pressure chamber 41 fluctuates greatly even when the opening degree of the actuator control valve 47 is not changed. Therefore, the inclination angle of the swash plate 12 is likely to be unstable when using the displacement control structure having only the actuator (14, 32, 37, 39, 45) and the controller (44, 47, 49, 48). However, in the second embodiment, only the control mechanism (48, 49, 51, 52, 53) is used for changing displacement in most of the variation range of the displacement of the compressor. Thus, the displacement control of the compressor is stable and the cooling performance of the air-conditioning system is improved.

A further embodiment of the present invention is described below.

Figure 4:
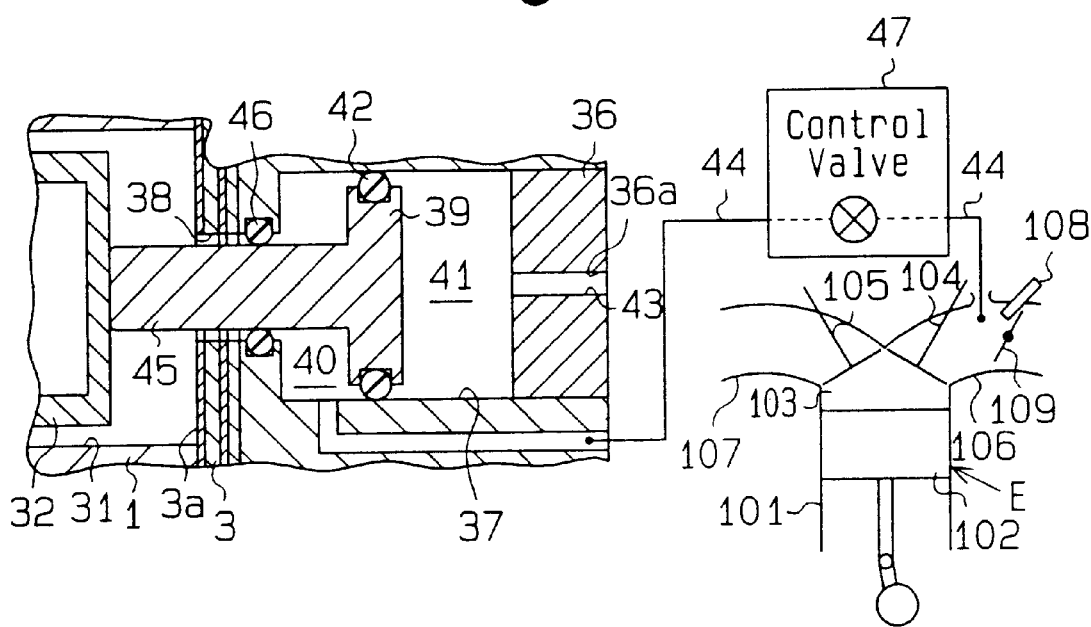
FIG. 4 is an enlarged partial cross-sectional view illustrating a displacement control apparatus according to a third embodiment.

According to a third embodiment shown in FIG. 4, the suction pressure, or vacuum pressure, of the internal combustion engine E may be applied to the actuator (14, 32, 37, 39, 45). In this case, the second pressure chamber 41 is exposed to the atmosphere. The first pressure chamber 40 is connected, by a pipe 44, to a vacuum zone between a throttle valve 109 and an intake valve 104 in an intake pipe 106. The vacuum zone has a pressure lower than atmospheric pressure.

When the opening degree of the actuator control valve 47 increases, the pressure in the first pressure chamber 40 decreases to a level substantially equal to the intake pressure of the internal combustion engine E. This increases the inclination angle of the swash plate 12. When the opening degree of the actuator control valve 47 decreases, the pressure in the first pressure chamber 40 increases to a level substantially equal to atmospheric pressure. This decreases the inclination angle of the swash plate 12. The structure shown in FIG. 4 shows a natural suction type internal combustion engine E. If the internal combustion engine E shown in FIG. 4 has a supercharger, the zone between the supercharger and the intake valve 104 in the intake pipe 106 may be used as an exhaust pressure zone. Therefore, structures similar to the structures of the first embodiment shown in FIGS. 1, 2 and the second embodiment shown in FIG. 3 may be driven by the supercharged intake pressure instead of the exhaust pressure.

In the first embodiment shown in FIGS. 1 and 2, the control rod 45, the coupler 32, and the swash plate 12 may be formed to integrally move axially. Then, the actuator control valve 47 may be changed to a three-way valve. In addition, the first pressure chamber 40 may also be connected to the actuator control valve 47. The pressure chamber to which the exhaust pressure of the internal combustion engine E is applied is selected by switching the flow passage of the actuator control valve 47. The first pressure chamber 40 or the second pressure chamber 41 is selected. The spool 39 moves axially in accordance with the position of the actuator control valve 47. In this case, the exhaust pressure (exhaust energy) of the internal combustion engine E is used to decrease the inclination angle of the swash plate 12. Thus, the coil spring 14 may be omitted.

A part of the pipe 44 and the actuator control valve 47 may be located in the housing of the compressor.

In the embodiments shown in FIGS. 1 to 4, the spool is used as a pressure sensing member, which is displaced in accordance with the difference between the pressures in the pressure chambers 40 and 41. However, for example, a bellows or a diaphragm may be used as a pressure sensing member instead of the spool.

According to the second embodiment shown in FIG. 3, the displacement control valve 53 may be used as a bleed control valve. In this case, the displacement control valve 53 may adjust the opening degree of the bleed passage 51 instead of the supply passage 52 for controlling the pressure in the crank chamber 5.

According to the second embodiment shown in FIG. 3, the actuator (14, 32, 37, 39, 45), the controller (44, 47, 49, 48), and the control mechanism (48, 49, 51, 52, 53) may be used to change the displacement of the compressor throughout the variation range of the displacement.

The present invention may be embodied in a displacement control apparatus for a wobble plate type variable displacement compressor.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered as illustrative and not restrictive and the invention is not to be limited to the details given herein, but may be modified within the scope and equivalence of the appended claims.

What is claimed is:

1. A displacement control apparatus for a variable displacement compressor used in a refrigerant circuit of an air conditioner, wherein the compressor is driven by an internal combustion engine, the compressor has an inclining drive plate and a piston, which is reciprocated by the drive plate, the stroke of the piston is changed in accordance with the inclination angle of the drive plate, and the displacement of the compressor is changed between a minimum displacement and a maximum displacement in accordance with the stroke of the piston, the apparatus comprising:

an actuator coupled to the drive plate, wherein the actuator is actuated by exhaust pressure or intake pressure from the engine; and a controller for changing the inclination angle of the drive plate by actuating the actuator.

2. The displacement control apparatus according to claim 1, wherein the compressor has a crank chamber, which accommodates the drive plate, wherein the inclination angle of the drive plate changes in accordance with the pressure of the crank chamber, wherein the displacement control apparatus has a control mechanism for adjusting the pressure of the crank chamber, and wherein the actuator, the controller, and the control mechanism are used for controlling the displacement of the compressor.

3. The displacement control apparatus according to claim 1, wherein, at least when the displacement of the compressor increases from the minimum displacement, the actuator and the controller are used for controlling the displacement of the compressor.

4. The displacement control apparatus according to claim 3, wherein the actuator and the controller are used for controlling the displacement in most of the range of the displacement of the compressor.

5. The displacement control apparatus according to claim 3, wherein, only when the displacement of the compressor is increased from the minimum displacement, the actuator and the controller are used for controlling the displacement of the compressor.

6. The displacement control apparatus according to claim 1, wherein the minimum displacement of the compressor is zero.

7. The displacement control apparatus according to claim 1, wherein the compressor includes a housing and the actuator includes:

a pressure sensing chamber formed in the housing;

a pressure sensing member for dividing the pressure sensing chamber into a first pressure chamber and a second pressure chamber; and a coupler for coupling the pressure sensing member to the drive plate.

8. The displacement control apparatus according to claim 7, wherein the controller includes:

a pressure control passage for introducing exhaust pressure or intake pressure from the engine to one of the first and second pressure chambers; and a control valve for controlling the opening of the pressure control passage.

9. The displacement control apparatus according to claim 7, wherein the actuator includes a spring, wherein the spring applies force to the pressure sensing member, and the force is opposed to a force that is based on the pressure difference between the first pressure chamber and the second pressure chamber.

10. The displacement control apparatus according to claim 2, wherein the refrigerant circuit has a discharge pressure zone and a suction pressure zone, the discharge pressure zone is exposed to the discharge pressure and the suction pressure zone is exposed to the suction pressure, wherein the control mechanism comprises:

a supply passage for connecting the discharge pressure zone to the crank chamber;

a bleed passage for connecting the crank chamber to the suction pressure zone; and a displacement control valve for controlling the opening of at least one of the supply passage and the bleed passage.

11. A displacement control apparatus for a variable displacement compressor used in a refrigerant circuit of an air conditioner, the compressor is driven by an internal combustion engine, and the compressor has an inclining drive plate and a piston, which is reciprocated by the drive plate, and the stroke of the piston is changed in accordance with the inclination angle of the drive plate, wherein the displacement of the compressor is changed between a minimum displacement and a maximum displacement in accordance with the stroke of the piston, the apparatus comprising:

an actuator coupled to the drive plate, wherein exhaust pressure or intake pressure from the engine is applied to the actuator to drive the actuator; and a controller for changing the inclination angle of the drive plate by controlling the actuator, wherein the controller has a valve for adjusting the exhaust pressure or intake pressure applied to the actuator, wherein, when the displacement of the compressor is increased from the minimum displacement, the valve is opened.

12. A method for controlling a displacement control apparatus for a variable displacement compressor used in a refrigerant circuit of an air conditioner, wherein the compressor is driven by an internal combustion engine, the compressor has an inclining drive plate and a piston, which is reciprocated by the drive plate, the stroke of the piston is changed in accordance with the inclination angle of the drive plate, and the displacement of the compressor is changed between a minimum displacement and a maximum displacement in accordance with the stroke of the piston, the method including:

changing the inclination angle of the drive plate by applying a force to the drive plate, wherein the force is created by exhaust pressure or intake pressure from the engine.

* * * * *